US010887068B2

(12) United States Patent
Ahmadi

(10) Patent No.: US 10,887,068 B2
(45) Date of Patent: *Jan. 5, 2021

(54) METHODS AND APPARATUS FOR AN EXTENSIBLE AND SCALABLE CONTROL CHANNEL FOR WIRELESS NETWORKS

(71) Applicant: Apple Inc., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,755

(22) Filed: Sep. 30, 2019

(65) Prior Publication Data

US 2020/0036496 A1 Jan. 30, 2020

Related U.S. Application Data

(63) Continuation of application No. 15/644,087, filed on Jul. 7, 2017, now Pat. No. 10,432,379, which is a continuation of application No. 13/557,121, filed on Jul. 24, 2012, now Pat. No. 9,705,654.

(60) Provisional application No. 61/557,329, filed on Nov. 8, 2011.

(51) Int. Cl.
*H04L 5/00* (2006.01)
*H04W 72/12* (2009.01)

(52) U.S. Cl.
CPC .......... *H04L 5/0053* (2013.01); *H04L 5/0062* (2013.01); *H04L 5/0094* (2013.01); *H04L 5/0073* (2013.01); *H04W 72/1289* (2013.01)

(58) Field of Classification Search
CPC ... H04L 5/0053; H04L 5/0062; H04L 5/0094; H04L 5/0073; H04W 72/1289
See application file for complete search history.

(56) References Cited

U.S. PATENT DOCUMENTS

2009/0276678 A1 11/2009 Ihara
2010/0284493 A1 11/2010 Bona et al.

FOREIGN PATENT DOCUMENTS

WO      2011/035420       3/2011
WO    WO 2011035420 A1   3/2011
WO    WO 2011137383 A1   11/2011

OTHER PUBLICATIONS

The interleaving schemes of R-PDCCH, ZTE, TSG-RAN WGI #60bis, Apr. 16, 2010.

*Primary Examiner* — Walter J Divito
(74) *Attorney, Agent, or Firm* — Fay Kaplun & Marcin, LLP

(57) ABSTRACT

Methods and apparatus to enable an extensible and scalable control channel for wireless networks. In one embodiment, an Enhanced Physical Downlink Control Channel (ePDCCH) is disclosed that is implemented with a flexible number of Physical Resource Blocks (PRBs). Advantages of the ePDCCH include, for example: more efficient spectral utilization, better frequency management across multiple serving entities (e.g., base stations and remote radio heads), and extensible payload capabilities that can scale to accommodate higher or lower control information payloads, as compared to prior art PDCCH solutions.

20 Claims, 10 Drawing Sheets

METHODS AND APPARATUS FOR AN EXTENSIBLE AND SCALABLE CONTROL CHANNEL FOR WIRELESS NETWORKS

PRIORITY

This application claims priority to U.S. Provisional Patent Application Ser. No. 61/557,329 filed Nov. 8, 2011, entitled "METHODS AND APPARATUS FOR AN EXTENSIBLE AND SCALABLE CONTROL CHANNEL FOR WIRELESS NETWORKS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the invention is directed to methods and apparatus for an extensible and scalable control channel for wireless networks.

2. Description of Related Technology

A cellular network operator provides mobile telecommunications services to a population of cellular user devices via a network infrastructure of e.g., cellular base stations (BS), base station controllers, infrastructure nodes, etc. One important aspect of cellular network operation relates to the control and management of the network resources. Within certain cellular technologies, a so-called "control channel" is dedicated to exchanging control information between the cellular base station, and the population of cellular user equipment.

Control channel design faces many challenges. In particular, a device is unaware of network operation until after the device has successfully decoded the control channel. For this reason, prior art control channels have allocated a pre-determined set of resources for control channel operation. Thus, even if a mobile device has no other information about a network, the mobile device can find the control channel based on the known pre-determined set of resources.

However, while control channels are necessary for network operation, they reduce the amount of resources available for data transfer. Consequently, given the pre-determined nature of existing control channel implementations, existing networks are typically inefficient, as the pre-determined control resources are purposely conservative, and not always fully utilized.

Still further, due to the importance of control channel information, significant effort is spent ensuring that control channel information is accurately received by the receiver. Existing solutions employ multiple countermeasures to protect control channel delivery, including for example robust coding schemes, and relatively higher transmission power for control channels. Unfortunately, these countermeasures also contribute to network under-utilization. For example, robust coding schemes are based on increasing redundancy (i.e., useful data is padded with redundant information); similarly, higher transmission power can increase interference in other channels. Higher control channel power also can adversely impact battery longevity in e.g., mobile cellular devices.

Accordingly, improved solutions for control channel operation within existing and future cellular networks is needed. Improved control channel operation would ideally: (i) increase control channel capacity, (ii) improve control channel scalability (iii) provide interference avoidance coordination, and (iv) reduce control channel overhead.

SUMMARY OF THE INVENTION

The present invention satisfies the aforementioned needs by providing, inter alia, improved apparatus and methods for an extensible and scalable control channel for wireless networks.

In a first aspect of the present invention, a method of operating a wireless network is disclosed. In one embodiment, the method includes; partitioning one or more frequency resources into a number of frequency partitions, where each frequency partition contains one or more control channel regions; assigning one or more mobile devices to a corresponding one of the one or more control channel regions; and transmitting control information associated with the assigned one or more mobile devices via the corresponding one of the one or more control channel regions.

In one variant, each control channel region includes an integer number of physically consecutive or logically consecutive physical resource blocks. In one example scenario, each control channel region is assigned to one or more remote radio entities associated with a macro-cell. In one such scenario, the device operates according to a time division duplex (TDD) scheme. Alternately, the device operates according to a frequency division duplex (FDD) scheme.

In another variant, the one or more frequency resources are further partitioned according to a time interval. In one such variant, the time interval is a time slot. Alternately, the time interval is a subframe.

In another embodiment, the method includes: transmitting one or more control channel regions having a capacity, where the one or more control channel regions are associated with a set of client devices; and responsive to a change in a control channel overhead for the set of client devices, adjusting the capacity of the one or more control channel regions.

In one variant, the adjusted capacity includes expanding a frequency range of the one or more control channel regions. In another variant, the adjusted capacity includes expanding a time range of the one or more control channel regions.

In one variant, the change in the control channel overhead includes a change to the population of client devices. Alternately, the change in the control channel overhead includes a change to one or more message formats.

In yet another embodiment, the method includes: partitioning one or more frequency resources into a number of frequency partitions, where each frequency partition contains one or more control channel regions; transmitting a first control channel region via a first frequency partition in a first geographic location; transmitting a second control channel region via the first frequency partition in a second geographic location; where the first and second geographic location are spatially distinct; and where the first and second control channel region share a common cell identifier.

In one variant, the one or more frequency partitions are further partitioned into one or more time partitions. In another variant, the one or more control channel regions include a plurality of physical resource blocks (PRBs). In one such variant, the plurality of PRBs are further permuted and distributed to a population of one or more client devices.

In other variants, the first geographic location is serviced by a first remote radio head (RRH), and the second geographic location is serviced by a second RRH.

In still another embodiment, the method includes: for a plurality of time intervals: permuting one or more control information associated with one or more mobile devices over one or more resource blocks of a control channel region; and transmitting the permuted one or more control information via the one or more resource blocks of the control channel region.

In one variant, the permuting is configured to maximize frequency diversity for the one or more control information. Alternately, the permuting is randomized.

In one variant, the control channel region has a frequency range which is a subset of an entire frequency range. In an alternate variant, the control channel region has a temporal range which is a subset of an entire temporal range.

In a fifth aspect of the present invention, a method of wireless operation is disclosed. In one embodiment, the method includes: partitioning one or more frequency resources into a number of frequency partitions, where each frequency partition contains one or more control channel regions; assigning one or more mobile devices to a corresponding one of the one or more control channel regions; and beamforming one or more control information transmissions associated with the assigned one or more mobile devices via a plurality of antennas.

In one variant, the control information transmissions include one or more reference signals specific to a corresponding one of the assigned one or more mobile devices.

In a sixth aspect of the present invention, a wireless transmitter is disclosed. In one embodiment, the wireless transmitter includes: a wireless interface, the wireless interface configured to communicate with one or more mobile devices; a processor; and a non-transitory computer-readable apparatus having a storage medium with at least one computer program stored thereon, the at least one computer program configured to, when executed on the processor: associate one or more mobile devices with a corresponding one or more control channel regions; and transmit control information associated with the associated one or more mobile devices via the corresponding one or more control channel regions.

In one variant, the wireless transmitter is a remote radio head (RRH) coupled to an external evolved Node B (eNB). In an alternate variant, the wireless transmitter is an evolved Node B (eNB).

In still other variants, the at least one computer program is further configured to partition one or more frequency resources into a number of frequency partitions, where at least one frequency partition contains the one or more control channel regions. In another variant, the at least one computer program is further configured to assign the one or more mobile devices to a corresponding one of the one or more control channel regions.

In another variant, the one or more frequency resources are further partitioned according to a time interval. In one such variant, the time interval is a time slot, or alternately, a subframe.

In a seventh aspect of the present invention, a wireless receiver is disclosed. In one embodiment, the wireless receiver includes: a wireless interface, the wireless interface configured to communicate with one or more base station devices; a processor; and a non-transitory computer-readable apparatus having a storage medium with at least one computer program stored thereon, the at least one computer program configured to, when executed on the processor: identify one or more control channel regions associated with the wireless receiver, transmitted by the one or more base station devices; and decode control information within the identified one or more control channel regions.

In one variant, the identified one or more control channel regions includes a frequency range which is a subset of an entire frequency range.

In another variant, the identified one or more control channel regions includes a temporal range which is a subset of an entire temporal range. For example, in one scenario the temporal range is a time slot. Alternately, the temporal range may be a subframe.

In one variant, the decoded control information includes one or more reference signals specific to the wireless receiver. In still other variants, the identification of one or more control channel regions is based on a message received from at least one of the one or more base station devices.

Other features and advantages of the present invention will immediately be recognized by persons of ordinary skill in the art with reference to the attached drawings and detailed description of exemplary embodiments as given below.

All Figures Copyright 2012 Apple Inc. All rights reserved.

DETAILED DESCRIPTION OF THE INVENTION

Reference is now made to the drawings, wherein like numerals refer to like parts throughout.

Detailed Description of Exemplary Embodiments

Exemplary embodiments of the present invention are now described in detail. While these embodiments are primarily discussed in the context of a third generation UMTS wireless network (3G), and more specifically in one variant to LTE (3.9G) and fourth generation LTE-A (4G) networks, it will be recognized by those of ordinary skill that the present invention is not so limited. In fact, the various aspects of the invention are useful in any wireless network that can benefit from extensible and scalable control channels for wireless networks described herein.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Furthermore, as used herein, the term "network" refers generally to any type of data, telecommunications or other network including, without limitation, data networks (including MANs, PANs, WANs, LANs, WLANs, micronets, piconets, internets, and intranets), satellite networks, cellular networks, etc.

Prior Art Physical Downlink Control Channel (PDCCH)—

Figure 1:
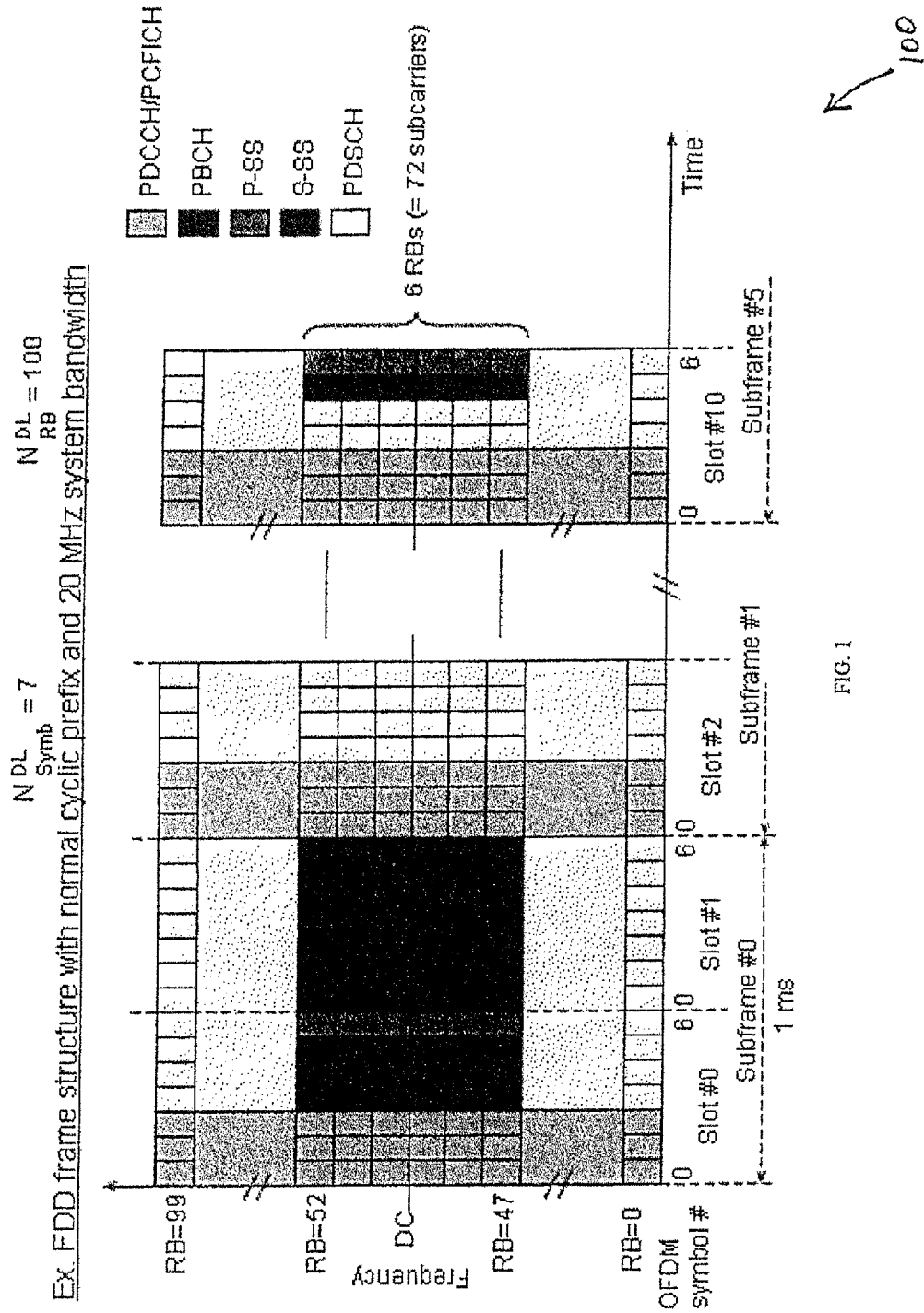
FIG. 1 is a graphical illustration of the prior art Long Term Evolution (LTE) control channel structure.

Referring now to FIG. 1, one illustration of the prior art Long Term Evolution (LTE) control channel structure 100 is shown. Each frame spans 10 ms and, consists of ten (10) subframes (numbered #0 to #9); where each subframe consists of two (2) slots (numbered #0, #1); and each slot consists of seven (7) OFDM symbols (numbered #0 to #6). The entire LTE bandwidth is split into N "sub-carriers" where N denotes the size of the FFT/IFFT. LTE data is transferred according to this time-frequency "resource grid". As shown, the downlink control signaling is located at the start of each downlink subframe, and may span up to the first three (3) OFDM symbols.

Downlink control signaling consists of three physical channels: (i) the Physical Control Format Indicator Channel (PCFICH), (ii) the Physical Hybrid-ARQ (Automatic Repeat Request) Indicator Channel (PHICH), and (iii) the Physical Downlink Common Control Channel (PDCCH). Each of the foregoing is described in greater detail hereinafter.

The PCFICH indicates the number of Orthogonal Frequency Division Multiplexing (OFDM) symbols (1, 2, or 3) used for control signaling in this subframe. The PCFICH contains a codeword which corresponds to the appropriate length of the PDCCH. The PCFICH is mapped onto the first OFDM symbol when present, however the PCFICH is only transmitted when the number of OFDM symbols for PDCCH is greater than zero.

The PHICH contains an acknowledgement (ACK) or non-acknowledgement (NACK) for uplink data transmission. PHICHs are located in the first OFDM symbol of each subframe, and are sent four (4) subframes after the HARQ-ed transmission across several (for example, if an uplink transmission occurs in subframe n, the corresponding PHICH will be in subframe n+4). A PHICH is carried by several Resource Element Groups (REGs); as a brief aside, each REG contains four (4) time-frequency Resource Elements (RE) and each RE corresponds to a specific time-frequency unit defined by a subcarrier and a symbol. Multiple PHICHs can share the same set of REGs using orthogonal spreading sequences as a so-called "PHICH group". Each PHICH is identified by two parameters: the PHICH group number, and the orthogonal sequence index within the group.

The PDCCH carries the downlink scheduling assignments and uplink scheduling grants for each UE. In slightly more detail, the PDCCH is transmitted on one or more consecutive Control Channel Elements (CCEs), where a CCE corresponds to a multiple of nine (9) Resource Element Groups (REGs). Briefly, the PDCCH carries scheduling assignments and other control information in the form of Downlink Control Information (DCI) messages. Each DCI is generated based on a set of parameters that includes: the number of downlink Resource Blocks (RBs), the DCI format, etc. The DCI messages are processed (e.g., channel coded, scrambled, modulated, precoded, and mapped to complex symbols), and mapped onto REs. The REGs/CCEs allocated for each downlink control signaling transmission are composed of these resultant REs.

As previously mentioned, the control region of a subframe (e.g., the first one, two or three OFDM symbols spanning the entire frequency band) contains PDCCHs for multiple UEs, thus each UE has to monitor a comparatively large area to extract its own control information (which is only a fraction of the entire control region). Since the UE does not know ahead of time the control channel structure, the UE has to decode the entire control region (the first three symbols of the entire spectral bandwidth). This imposes a substantial burden on the UE; the significant burden of control channel decoding increases the component complexity (and cost), and also reduces the performance of the UE and to some degree adds to battery drain.

More generally, the existing PDCCH structure was designed to provide control signaling and resource assignments for User Equipments (UEs) based on a single transmission point per macro-cell usage scenario. However, many usage scenarios have emerged which do not fall into a single transmission point paradigm. Several of these scenarios are described in greater detail hereinafter.

In one such example, significant research has been directed to Coordinated Multiple Point (CoMP) techniques that enable transmission and reception of signals from multiple cell sites. In various CoMP scenarios, multiple cell sites can coordinate transactions. For instance, in so-called "CoMP scenario 4" (as described within 3*GPP TR* 36.819 *Technical Specification Group Radio Access Network; Coordinated multi point operation for LTE physical layer aspects* (*Release* 11) published September 2011, incorporated by reference in its entirety), several Remote Radio Heads (RRH) having the same physical Cell Identifier (Cell ID) are deployed within a single macro-cell. Existing implementations of RRH can be considered geographically distinct antennas that are controlled by an eNB via a fiber (or other high-speed data link). Since each RRH has the same Cell ID, the RRHs are indistinguishable from the eNB by the UE. Thus, each RRH provides a virtually identical radio interface at a different physical location which results in improved physical coverage of the cell within an area. While CoMP scenario 4 provides improved coverage, CoMP scenario 4 does not provide any increase in capacity.

In another such example, within so-called "CoMP scenario 3", each RRH has a different Cell ID relative to the associated macro-cell. Since the eNB and RRHs share the same time/frequency resources but are no longer indistinguishable from one another, the eNB and RRH will interfere with one another causing significant intra-cell interference. Furthermore, in the context of CoMP scenario 3, the resource assignments corresponding to each RRH are under control of the eNB; each assignment has to be simultaneously transmitted to the RRHs to ensure proper coordination. However, this control overhead causes a significant increase in the number of resource assignments, and reduces the number of available Control Channel Elements (CCEs) per subframe, Thus, the requirements of CoMP scenario 3 can significantly strain the limited capacity of existing PDCCH operation. Moreover, in this context, techniques for detecting existing PDCCH structures in subframes with strong interference may be unsatisfactory. Proposed solutions include, for example, scheduling an Almost Blank Subframe (ABS) in one node to reduce interference while other nodes are transmitting. Unfortunately, ABS schemes require the blanking network node to reduce its own activity (e.g., transmission power) in the ABS, which is very inefficient from a spectral utilization standpoint. As with CoMP scenario 4, CoMP scenario 3 consumes significant control channel capacity.

Furthermore, several improvements have been made since the initial PDCCH design (PDCCH is described within 3*GPP TS* 36.300, "*Technical Specification Group Radio Access Network; Evolved Universal Terrestrial Radio Access (E-UTRA) and Evolved Universal Terrestrial Radio Access Network (E-UTRAN); Overall description; Stage* 2 (*Release* 11), published September 2011, incorporated by reference in its entirety). Specifically, new transmission modes have been implemented or proposed based on UE-specific reference signals that have been designed to support Multi-User Multiple Input Multiple Output (MU-MIMO). For example, it is anticipated that so-called "Transmission Mode 9" will be widely used in future deployments (Transmission Mode 9 is described within 3*GPP TS* 36.213 *Technical Specification Group Radio Access Network; Evolved Universal Terrestrial Radio Access (E-UTRA); Physical layer procedures*, published March 2012, incorporated by reference in its entirety). Transmission Mode 9 enables seamless switching between Single User MIMO (SU-MIMO) and MU-MIMO. Unfortunately, the Downlink Control Information (DCI) format used with Transmission Mode 9 (i.e., DCI format 2C) has a very large payload size. Since, the existing PDCCH structure has a fixed format (only 1, 2, or 3 of the first OFDM symbols of a subframe), the PDCCH must operate with fewer resource assignments (i.e., fewer CCEs per subframe) in order to support the large payloads of e.g., DCI format 2C. Thus, existing PDCCH structures are poorly suited to handle new payload structures and/or payload structures of significant size.

Moreover, in certain environments, neighboring transmission nodes may interfere with each other. The existing PDCCH mechanisms in earlier releases of LTE may not be sufficient for robust transmission of control channels in dense and diverse deployments. For example, the enhancement of MIMO performance through improved Channel State Information (CSI) feedback for high priority scenarios is not directly targeted by the feedback enhancements in 3*GPP TS* 36.213 *Technical Specification Group Radio Access Network; Evolved Universal Terrestrial Radio Access (E-UTRA); Physical layer procedures*, published March 2012 incorporated by reference in its entirety. In fact, scenarios where multiple (e.g., four (4)) transmit antennas operate in a cross-polarized configuration have yet to be studied in homogeneous and heterogeneous scenarios. While it is currently not known whether existing solutions can provide sufficient performance, it is likely that current solutions provide inadequate interference avoidance coordination.

Furthermore, due to capacity limits of existing PDCCH structures, some data resources may not be timely allocated. For example, existing PDCCH structures use a hashing function to map CCEs within the so-called "control region". Those of ordinary skill in the related arts will recognize that a hashing function does not guarantee unique mappings, and in some cases two or more candidate sets can collide. The probability of collision is further exacerbated when UEs choose aggregation levels greater than one. During collisions, the number of assignments that can be transmitted on the PDCCH are limited (i.e., only the one of the candidate sets is transmitted), which reduces the overall user throughput and increases the overall transmission latency.

Additionally, existing PDCCH structures were designed based on an assumed single frequency partition in each slot/subframe with a frequency reuse factor of one. Colloquially, this is known as "hard" frequency partitioning. In contrast, "soft" frequency partitioning schemes can be dynamically changed in software to adjust to different partitioning schemes and accommodate different frequency reuse schemes. Hard frequency partitioning cannot be used with Fractional Frequency Reuse (FFR) techniques, FFR in conjunction with soft frequency partitioning can be used to mitigate interference, resulting in improved robustness and reliability of control and data signaling. Furthermore, use of frequency division multiplexing of data and control regions would allow for finer power control for each channel.

Still further, existing PDCCH operation relies on Cell-specific Reference Signals (CRS) for channel estimation and coherent detection. Empirically, CRS schemes require significant overhead (e.g., the CRS does not contain any useful information and is broadcast at significant power) and are ineffective for certain applications (e.g., closed-loop precoding techniques, beamforming and Multi-User Multiple Input Multiple Output (MU-MIMO)).

Finally, existing PDCCH operation is based on a resource allocation granularity of one, two, or three OFDM symbols for the PDCCH, Each OFDM symbol consumes approximately 7% of network overhead; this resource allocation granularity is quite large, and contributes to an excessive amount of wasted resources.

Existing solutions for LTE PDCCH have significant limitations, including: (i) limited capacity, (ii) limited payload capabilities, (iii) inadequate interference avoidance coordination, (iv) poor user throughput, (v) insufficient frequency reuse capabilities, (vi) no beamforming capabilities, and (vii) excessive overhead. Accordingly, an improved extensible and scalable solution for control channel operation within existing and future cellular networks is needed.

"Enhanced" Physical Downlink Control Channel—

In view of the deficiencies of the existing PDCCH structure, new and improved solutions for an Enhanced Physical Downlink Control Channel (ePDCCH) are desired. Ideally, an improved ePDCCH should exhibit one or more of the following attributes: (i) support increased control channel capacity, (ii) support frequency-domain Enhanced Inter-cell Interference Coordination (eICIC), (iii) achieve improved spatial reuse of control channel resource, (iv) support beamforming and/or diversity, (v) operate on new carrier types and support future enhancements to physical layer features such as e.g., Multicast Broadcast Single Frequency Networks (MBSFN) subframes (see e.g., 3*GPP TS* 36.211 *Technical Specification Group Radio Access Network; Evolved Universal Terrestrial Radio Access (E-UTRA); Physical channels and Modulation (Release* 101, published March 2011 incorporated by reference in its entirety), (vi) coexist on the same carrier technologies with legacy UEs, and/or (vii) use frequency-selective scheduling to mitigate inter-cell interference.

Accordingly, in one exemplary embodiment of the present invention, an ePDCCH region is defined in the time and frequency domain. Unlike prior art PDCCH channel structures which are limited to the first few symbols of each subframe and transmitted over the entire spectral bandwidth of a cell, in one variant the inventive ePDCCH is distributed throughout the spectral bandwidth according to a frequency, time, and/or transmitter. In one such variant, each Remote Radio Head (RRH) is allocated an ePDCCH region that is defined according to according to a set of one or more enhanced CCE (eCCE), where each eCCE is further encapsulated within a single Physical Resource Block (PRB) in each slot/subframe. Each exemplary PRB consists of twelve (12) consecutive subcarriers for a single slot. Moreover, each RRH is associated with a subset of the users of the cell; thus each ePDCCH region can be reduced to only the spectral resources necessary to serve the subset of users associated with the RRH.

As a brief aside, a PRB is the smallest granularity of spectral resources that an exemplary LTE evolved NodeB (eNB) can schedule. Depending on the size of the eCCE, there may be one or more eCCEs within a PRB. As described in greater detail hereinafter, this configurable structure enables, inter alia, frequency division multiplexing of ePDCCH with other channels such as e.g., Physical Downlink Shared Channels (PDSCH). For example, PDSCH can advantageously be interleaved into spectral bandwidths that are unused by the ePDCCH (and vice versa).

Additionally, the flexible eCCE structure can accommodate multiple DCI formats which are necessary to support current and future applications and enhanced modes (e.g., Multiple Input Multiple Output (MIMO), etc.). Furthermore, the resource blocks used for ePDCCH may be permuted and allocated in a localized or distributed manner to exploit frequency diversity gain.

In one exemplary variant, Demodulation Reference Signals (DM-RS) are exclusively used for channel estimation and coherent detection within resource blocks assigned to a particular user. By removing the reliance on Cell-specific Reference Signals (CRS) for channel estimation and coherent detection, various embodiments of the present invention can be further leveraged with MU-MIMO and beamforming schemes for providing ePDCCH. Specifically, the UE can adjust reception according to existing DM-RS signaling according to existing beamforming techniques. Using the beamforming weighting vectors, the UE can receive ePDCCH from the serving BS. The ability to receive a beamformed ePDCCH greatly improves network reliability and coverage.

Moreover, in one backward compatible variant, the ePDCCH can be further subdivided into an "even-region" and an "odd-region". The even-region ePDCCH shares the even numbered slots with legacy PDCCH formats. The odd-region ePDCCH occupies the odd numbered slots. This configuration ensures backward compatibility and legacy support white introducing a new frequency division multiplexed (FDM) control structure.

In one such embodiment, the search spaces (both common and UE specific) of the Release 11 UEs is separated from those of earlier releases. This allows independent operation of Release 11 UEs and eNBs in so-called "green-field" deployments (i.e., where no previous network infrastructure has been deployed) without depending on legacy configurations, which results in lower overhead.

Additionally it will be appreciated, that similar (if not identical) structures can be used for time division duplexing (TDD) and frequency division duplexing (FDD) networks. This dual natured structure for ePDCCH in TDD and FDD operation can reduce the cost and complexity of multi-mode devices.

Finally, since some networks have favored small-sized cells and small-range dense deployments, some variants may use higher modulation orders such as 16 QAM (Quadrature Amplitude Modulation) for baseband processing of the control channels. Specifically, the lower path loss and higher operational SINRs (Signal to Interference plus Noise Ratios) enabled by various aspects of the present invention are particularly well suited to small and dense cell deployments, although by no means limited thereto.

Figure 2A:
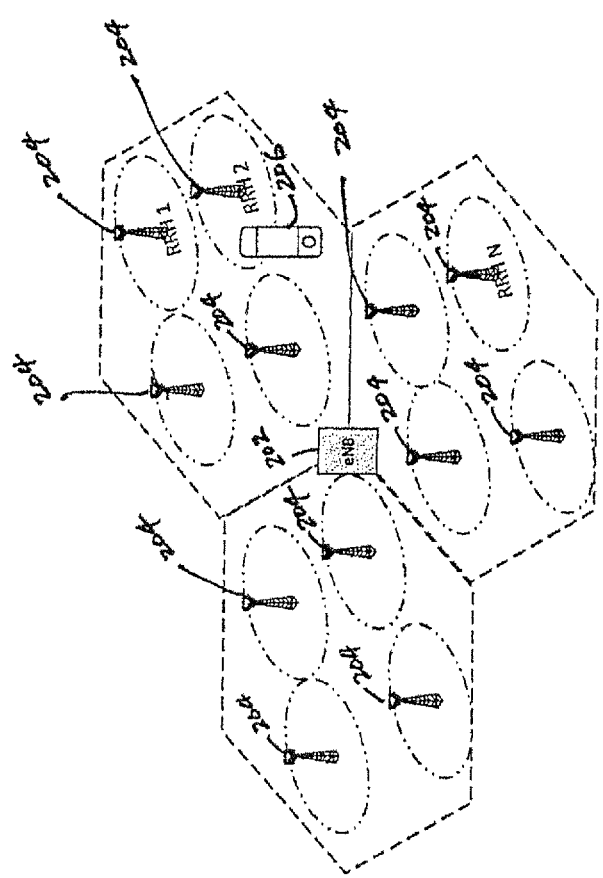
FIG. 2A illustrates one exemplary Enhanced NodeB (eNB) and an array of Remote Radio Heads (RRH) which are used to provide improved coverage for a population of User Equipments (UEs), useful in conjunction with various aspects of the present invention.

One exemplary embodiment of an Enhanced Physical Downlink Control Channel (ePDCCH) structure that satisfies the current expectations while also remaining extensible and scalable for future improvements and modifications is now described in greater detail herein. FIG. 2A illustrates one exemplary Enhanced NodeB (eNB) 202 and an array of Remote Radio Heads (RRH) 204 which are used to provide improved coverage for a population of User Equipments (UEs) 206. As shown, each RRH provides a small area of coverage which augments the cell that is provided by the eNB. However, it is important to note that the coverage area for each RRH (~100 ft) is significantly smaller than the range of the cell (e.g., up to a mile).

Figure 2B:
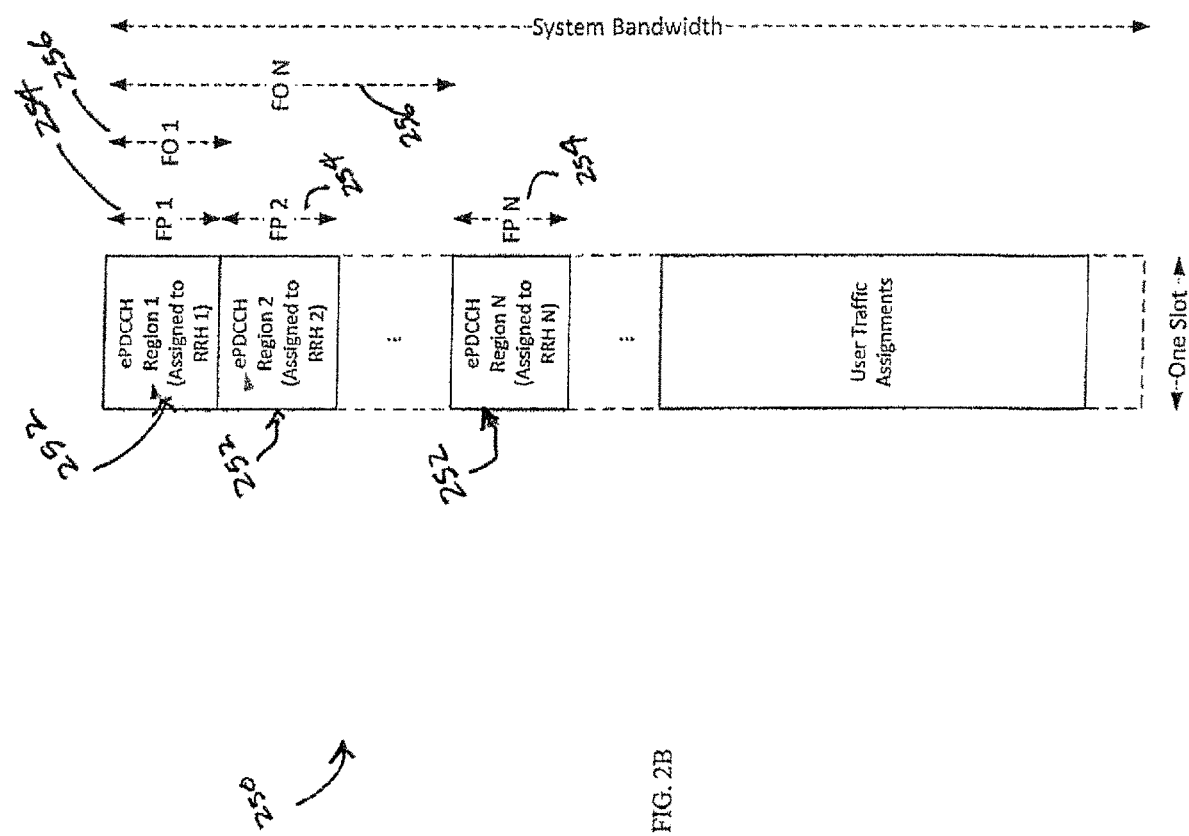
FIG. 2B is a graphical illustration of one embodiment of a structure for enhanced Physical Downlink Control Channel (ePDCCH) regions according to the invention.

FIG. 2B illustrates one high-level conceptualization of the exemplary ePDCCH structure and design 250. The frequency resources in each slot (or subframe depending on the desired time-domain granularity and the choice of Transmission Time Interval (TTI)) are partitioned into a number of Frequency Partitions (FP), where each frequency partition contains one or more ePDCCH regions. Each ePDCCH region consists of an integer number of physically consecutive (localized) or logically consecutive (distributed) physical resource blocks (PRBs). Each ePDCCH region may be assigned to one or more Remote Radio Heads (RRH) associated with a macro-cell.

As shown in FIG. 2B, the ePDCCH regions 252 are located in the same or different frequency partitions 254. In one exemplary embodiment, the partitioning of frequency resources is flexible and can be dynamically configured, e.g., the frequency resources may change over time based on a cell-specific, semi-static or dynamic pattern. The ePDCCH regions are located in predetermined (configurable) frequency partitions and the beginning of each region is calculated based on a frequency offset (FO) 256 from the reference location.

Figure 2C:
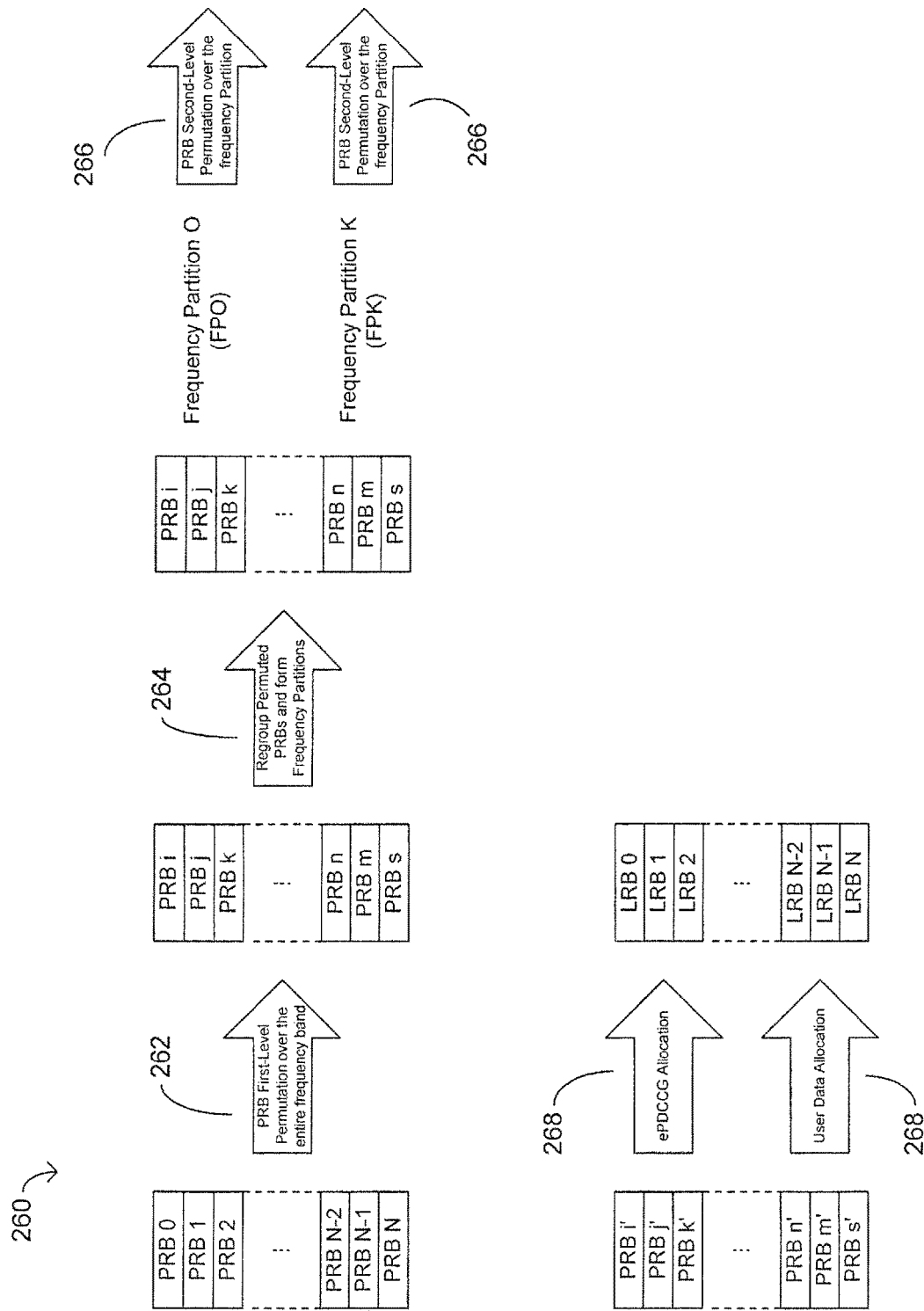
FIG. 2C is a graphical representation of one exemplary procedure for forming ePDCCH regions over a slot according to one embodiment of the invention.

Referring now to FIG. 2C, the exemplary procedure 260 for forming the frequency partitions and the ePDCCH regions is illustrated. At step 262 of the method 260, the PRBs are permuted over the entire available system bandwidth to exploit frequency diversity gain. The permuted PRBs are regrouped and form frequency partitions $FP_0$ to $FP_K$ ((step 264). The number of frequency partitions is configurable and depends on the network deployment parameters and topology. At step 266, a second-level permutation may be applied to the PRBs within each frequency partition to further exploit frequency diversity gain. Once the PRBs have been evenly distributed over the spectral bandwidth, at step 268 the permuted PRBs within each partition can be divided into one or more ePDCCH regions. The grouping and the number of ePDCCH regions depend on the number and the relative position of the RRHs that may or may not share the same cell ID within a macro-cell. In one exemplary embodiment, RRHs which are in close proximity to one another will have different ePDCCH regions to minimize ePDCCH interference.

Figure 3:
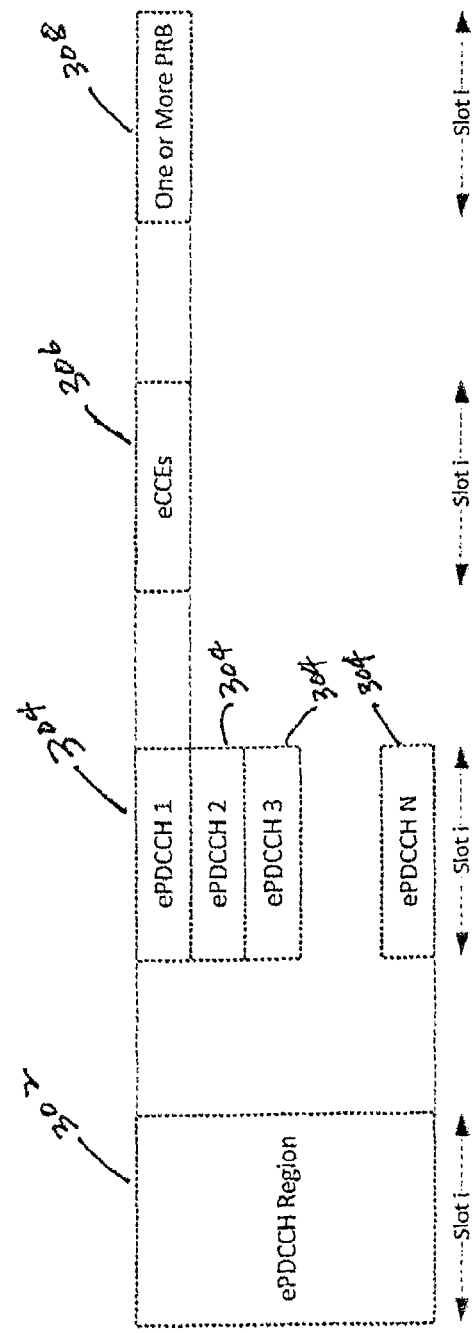
FIG. 3 is a graphical representation of the contents of the ePDCCH region according to one embodiment of the invention.

FIG. 3 illustrates one exemplary ePDCCH region in further detail. As shown, each ePDCCH region 302 contains one or more ePDCCH 304 corresponding to the UEs that are served by the eNB (e.g., ePDCCH1 corresponds to UE1, ePDCCH2 corresponds to UE2, etc.). The location of the ePDCCH regions and individual ePDCCH channels are coordinated across neighboring eNBs to reduce the inter-cell interference (e.g., across multiple eNBs, ePDCCH allocations for each eNB are scheduled so as to minimize collision with neighboring eNBs). Within each cell, the eNB coordinates the ePDCCH regions corresponding to Remote Radio Heads (RRHs) managed within a cell. Each ePDCCH is mapped to a number of enhanced Control Channel Elements (eCCEs) 306 depending on the desired aggregation level. One or more eCCEs are mapped to one or more PRB 308.

Figure 4:
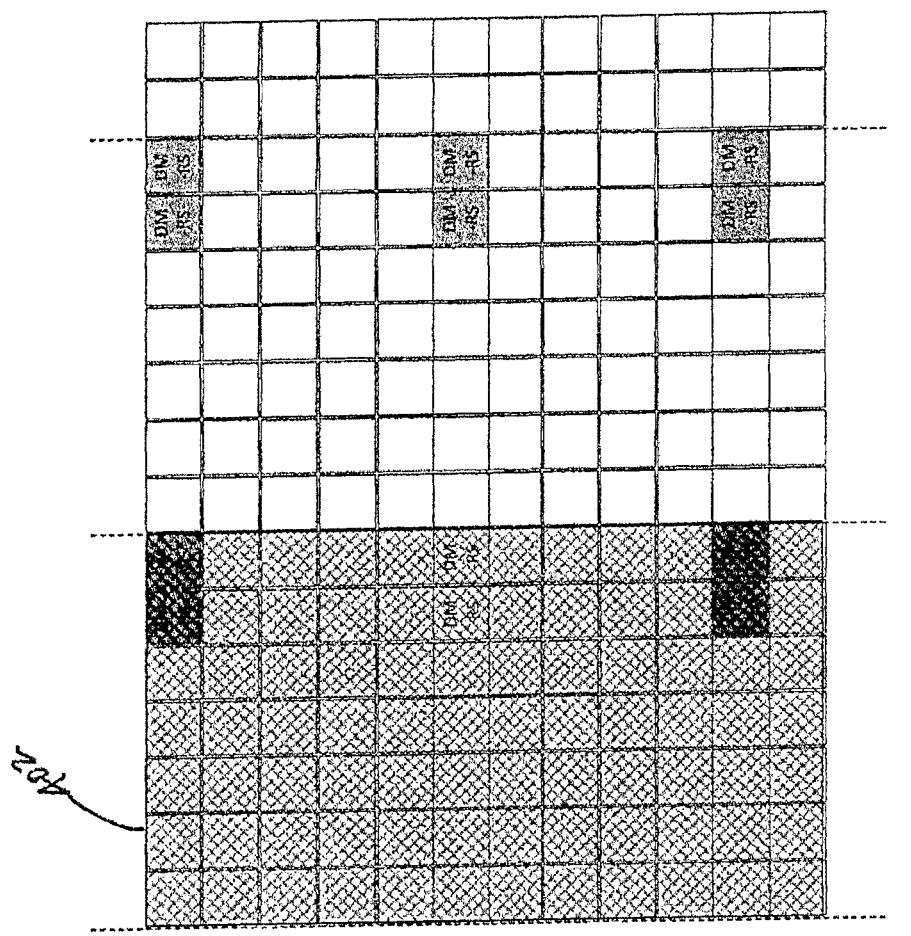
FIG. 4 is a graphical representation of the structure of the physical resource block according to one embodiment of the invention.

FIG. 4 illustrates one exemplary structure of a Physical Resource Block (PRB) including Demodulation Reference Signals (DM-RS). As shown, the exemplary PRB 402 is 12 sub-carriers by 7 symbols. For an exemplary eCCE of 36 sub-carriers (or alternatively resource elements), the exemplary PRB (which consists of 84 resource elements) can hold up to two eCCE. As shown, the Demodulation Reference Signal (DM-RS) locations are based on one exemplary scenario where the same Orthogonal Cover Code (OCC) is used for multiplexing of two DM-RS corresponding to two transmit antennas. Higher order antenna configurations will include more DM-RS signals to support e.g., beamforming of the UE-specific control channels. Specifically, higher order antenna configurations can use additional DM-RS to create sharper and/or more complex beam footprints by adjusting the antenna powers to constructively interfere (i.e., within the beam footprint), and destructively interfere (i.e., out of the beam footprint). Moreover, where multiple eCCE are aggregated together (where multiple eCCEs are grouped for an ePDCCH), the aggregated eCCE units may be mapped to different PRBs to ensure maximal use of frequency diversity.

Figure 5:
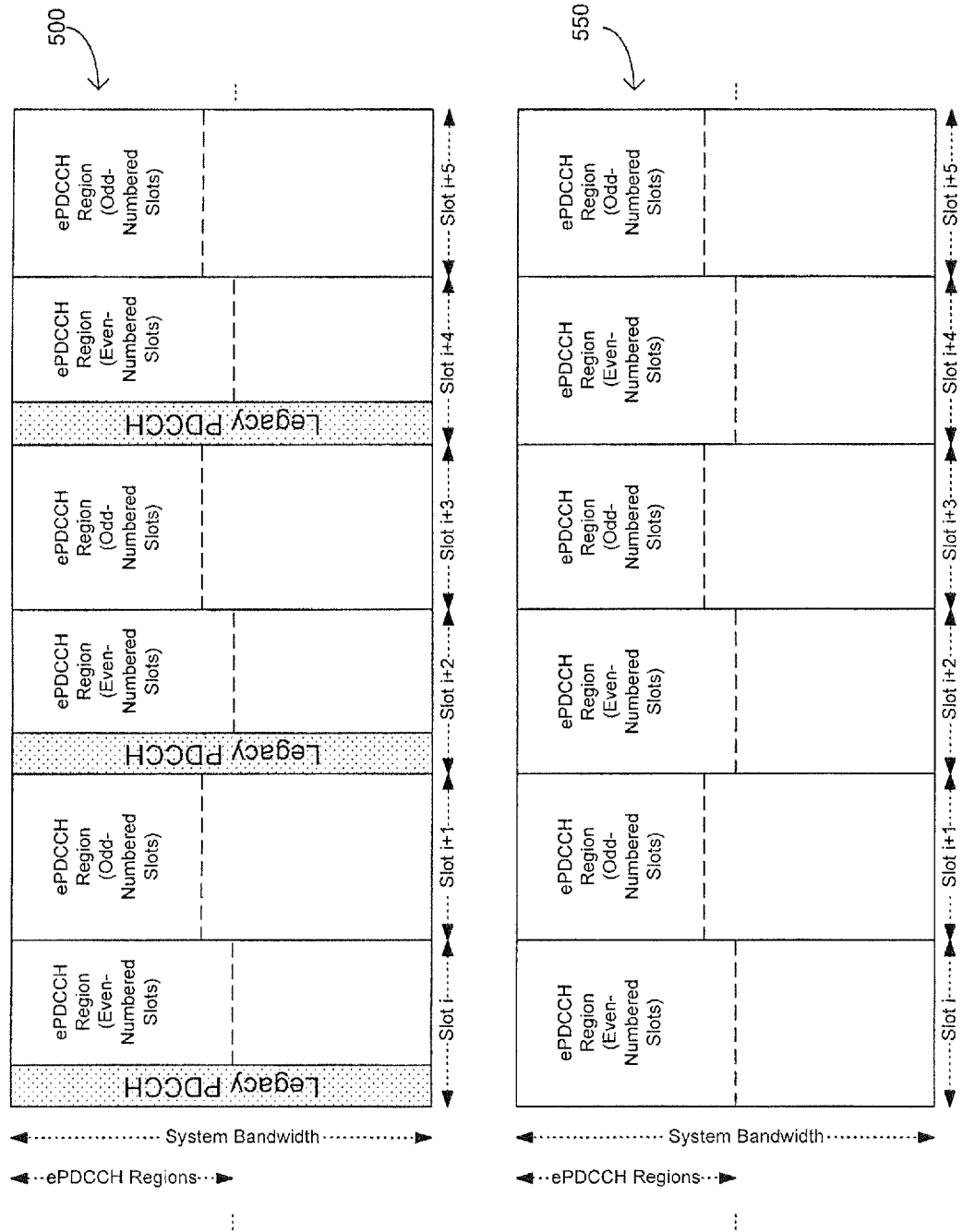
FIG. 5 is a graphical representation of the relative location of ePDCCH in time and frequency in backward compatible and non-backward compatible carrier types according to one embodiment of the invention.

Referring now to FIG. 5, two exemplary configurations (500, 550) are illustrated, the first configuration 500 remains compatible with legacy equipment, and the second configuration 550 is incompatible with legacy equipment. Since user traffic is allocated in PRB pairs over a subframe, in consideration for downlink link budget, the ePDCCH may or may not exist in each downlink slot. For smaller cell size variants, the existing minimum transmission time interval (TTI) of 1 ms may be further reduced to 0.5 ms (one slot). This shorter TTI further reduces the user-plane and control-plane latency and increases the spectral efficiency. In such variants, an ePDCCH is required for each downlink slot, enabling resource allocations on a slot-by-slot basis. Moreover, it is recognized that this structure is the same for TDD and FDD duplex schemes. For example, depending on the TDD frame configuration mode, the ePDCCH can be transmitted in the downlink slots (or subframes) similar to that of FDD systems.

Referring now to the first configuration 500, each subframe is split into an even and an odd slot. During the even slot, the legacy PDCCH is transmitted, and ePDCCH. During the odd slot, ePDCCH can be transmitted. It is appreciated that a legacy device can decode the legacy PDCCH normally within the first configuration; however, in addition enhanced devices can decode ePDCCH in accordance with various aspects of the present invention. Moreover, it should be appreciated that the amount of information provided via the legacy PDCCH can be greatly reduced to only the information necessary to service legacy devices, and enhanced devices can rely primarily on the ePDCCH. Furthermore, since the PDCCH has relatively large granularity (e.g., 7%), it is appreciated that a subset of enhanced devices may receive information via the PDCCH to fully utilize allocated PDCCH resources (as opposed to receiving information via a ePDCCH, while allocated PDCCH resources are left unused).

In contrast to the first configuration 500, the second configuration 550 relies solely on ePDCCH for control information signaling. Operation of the second configuration requires either a population of enabled user devices, or alternately that legacy devices are precluded from access, or combinations thereof. In some variants, operation of the second configuration may be offered in tandem with a secondary bandwidth specifically to service legacy devices only (i.e., a first bandwidth is provisioned for enabled users and a second bandwidth is provisioned for legacy users).

In comparison to prior art PDCCH structures, the ePDCCH is advantageously much more flexible and scalable. For example, the ePDCCH can support control signaling and resource assignments from multiple transmission points within macro-cell deployments. Consider Coordinated Multiple Point (CoMP) scenario 3 and CoMP scenario 4 operation (described supra) in conjunction with ePDCCH operation according to various aspects of the present invention; each RRH may transmit ePDCCH assignments without interfering with other RRHs, because their corresponding ePDCCH's time frequency resources are not shared among neighboring RRHs (i.e., neighboring RRHs are assigned to different ePDCCH regions). Since each RRH does not interfere with its neighbor RRHs, interference avoidance coordination can be handled much more effectively via extant interference mitigation. Specifically, since the neighbor RRHs only contribute unrelated interference, their transmissions can be treated effectively as uncorrelated noise.

Similarly, arbitrarily large payloads can be accommodated by allocating more eCCE where necessary. This flexible payload capability can accommodate larger format DCIs (e.g., Transmission Mode 9, etc.). Moreover, since the size of ePDCCH regions can be larger (or smaller), collisions across different cells and inter-cell interference can be more effectively and flexibly mitigated]

Furthermore, the ePDCCH can accommodate multiple frequency partitions to support e.g., soft frequency partitioning and/or Fractional Frequency Reuse (FFR) techniques. Specifically, the ePDCCH can be flexibly allocated across various PRBs to support various frequency allocations including e.g., several soft and configurable frequency partitions in each slot/subframe and frequency division multiplexing of control and data regions. Frequency division multiplexing of data and control regions allow for separate power control for each channel type.

Moreover, various embodiments of the ePDCCH perform channel estimation and coherent detection via Demodulation Reference Signals (DM-RS) which are specific to a subscriber device, thus mitigating many of the inefficiencies of Celt-specific Reference Signals (CRS) based schemes (which are uniform for the entire cell and are not user specific). Additionally, the use of DM-RS (instead of CRS) is necessary to enable beamforming of control channels; in particular, user specific DM-RS can be configured on an antenna-by-antenna basis, to create a beamformed transmission. There is no such benefit to beamforming CRS which is cell-specific and used across the entire cell.

Finally, control channel overhead for a PRB-based ePDCCH can be much more efficient than prior art solutions. For example, prior art solutions reserve one or more OFDM symbols over the entire system bandwidth which consumes approximately 7% of overall system bandwidth for each OFDM symbol. In contrast, the resource allocation granularity (L1/L2 overhead per FRB) in the exemplary implementations of the invention is 2% for a 10 MHz system, and only 1% in a 20 MHz system.

Other Scenarios

Moreover, those of ordinary skill in the related arts will further recognize, given the contents of the present disclosure, that various aspects of the present invention are further useful in other applications. For example, in Carrier Aggregation (CA) based Enhanced Inter-cell Interference Coordination (eICIC) and heterogeneous networks, the ePDCCHs of macro nodes and low-power nodes can be transmitted on different component carriers. As a brief aside, CA allows a network to provision large chunks of bandwidth by aggregating multiple smaller bandwidths.]. Thus, in one exemplary embodiment, cross-carrier scheduling can be provided for the CA-enabled UEs. In cross-carrier scheduling, the ePDCCH is provided in a first carrier, and provides information regarding the operation of a second carrier of a CA system. In one variant, the ePDCCH resources on the cross-scheduled carrier are limited (thus the cross-scheduled carrier maintains some resources for its own traffic operation, etc.). In some further variants, the ePDCCH resource limitation can be adjusted to depend on the number of UEs configured with carrier aggregation in CA-based heterogeneous networks.

In another such example, inter-band carrier aggregation functionality includes scenarios where a lower frequency band is aggregated with a higher frequency band. Typically, larger coverage is achieved on the lower frequency band due to desirable propagation loss resistance of lower frequency bands. Accordingly, it is possible to increase the traffic channel coverage on the higher frequency band through cross-carrier scheduling from an ePDCCH on the lower frequency band. Specifically, unlike prior art solutions which use a fixed allocation for providing the PDCCH, the ePDCCH can be flexibly allocated within various frequency bands.

In yet other examples, additional carrier types can be supported in future systems (e.g., Release 11). For example, future releases may not be backward compatible; i.e., legacy PDCCH may not be transmitted on future spectrum. Without further enhancements in the downlink control channels, the PDSCH/PUSCH channels on the non-backward compatible carriers may only rely on cross-carrier scheduling from a backward compatible carrier. Given that the bandwidth and the number of UEs connected to the non-backward compatible carriers can be similar to backward compatible carriers, the PDCCH resource on the cross-carrier scheduling carrier (i.e., where PDCCH is sent) can be significantly limited. By providing more flexibility with an ePDCCH, future releases are no longer limited to cross-carrier scheduling from backward compatible carriers.

Various enhanced MIMO modes can also be supported with the new ePDCCH structure. The new ePDCCH substantially improves the robustness of the control channels and thus mitigates the interference among neighboring transmission nodes in dense and diverse deployments. Consequently, the ePDCCH structure allows interference avoidance/coordination by orthogonalizing the UEs in neighboring cells. Additionally, CoMP scenarios 3 and 4 will benefit from the ePDCCH structural flexibility, and capacity. Downlink control enhancement for carrier aggregation is primarily used in scenarios where cross-carrier scheduling is applied. The number of UEs configured with cross-carrier scheduling in each carrier aggregation scenario will determine whether ePDCCH is needed to support carrier aggregation scenarios.

In Release 8, Release 9 and Release 10, the control region of the PDCCH only supports transmit diversity transmission mode. The transmit diversity scheme is a robust transmission scheme but the efficiency may not be as good as beamforming based on spatial information especially in correlated environment. Unfortunately, increasing the number of transmit antennas may not yield higher MIMO gain for transmit-diversity-based PDCCH transmission, in fact in some preliminary testing transmit diversity actually results in performance degradation in some scenarios. Various embodiments of the present invention support beamforming which should further improve coverage.

Finally, in Release 8, Release 9 and Release 10, PDCCH only supports QPSK modulation. The ePDCCH should significantly improve link quality (e.g., due to precoding/beamforming), thus, ePDCCH should also support higher order modulation in high SINR region. Higher order modulation will increase the spectral efficiency, and reduce overall system overhead of control channel. In small-cell and dense deployments where the SINR is higher, ePDCCH can support higher order modulation (e.g., 16 QAM) for the control channel.

Exemplary User Equipment (UE) Apparatus—

Figure 6:
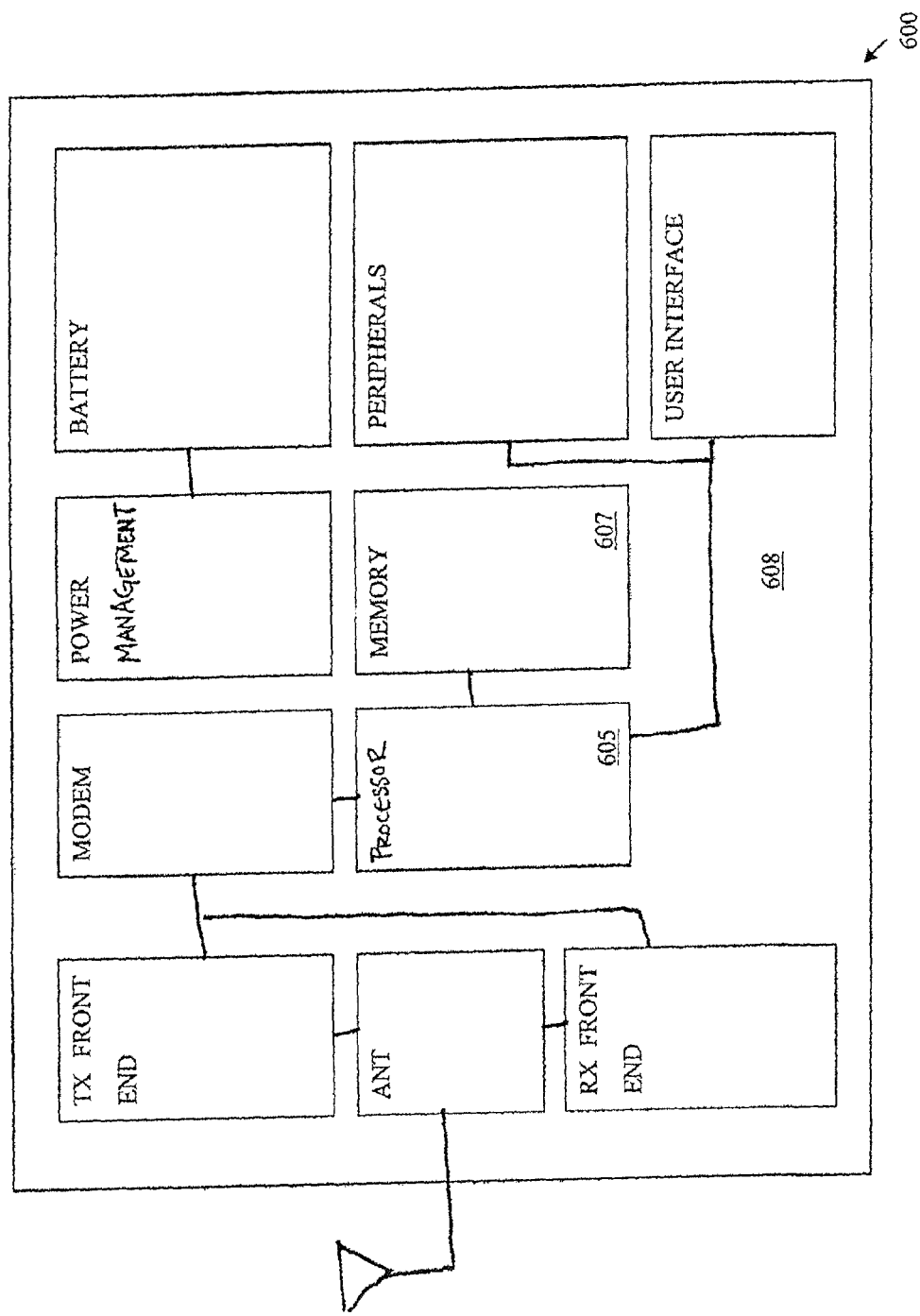
FIG. 6 is a functional block diagram illustrating one embodiment of a client or user device incorporating the enhanced control channel functionality of the invention.

Referring now to FIG. 6, exemplary client or UE apparatus 600 useful in implementing the methods of the present invention is illustrated. As used herein, the terms "client" and "UE" may include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers (e.g. iPad™), PDAs, personal media devices (PMDs), such as for example an iPod™, or any combinations of the foregoing. The configuration of control channel reception is preferably performed in software, although firmware and/or hardware embodiments are also envisioned; this apparatus is described subsequently herein with respect to FIG. 6.

The UE apparatus 600 includes a processor subsystem 605 such as a digital signal processor, microprocessor, field-programmable gate array, or plurality of processing components mounted on one or more substrates 608. The processing subsystem may also include an internal cache memory. The processing subsystem 605 is connected to a memory subsystem 607 including memory which may for example, include SRAM, flash and SDRAM components. The memory subsystem may implement one or a more of DMA type hardware, so as to facilitate data accesses as is well known in the art. In the illustrated embodiment, the processing subsystem additionally includes subsystems or modules for implementing the enhanced control channel functionality described previously herein. These subsystems may be implemented in software or hardware which is coupled to the processing subsystem. Alternatively, in another variant, the subsystems may be directly coupled to the digital baseband.

In one exemplary embodiment, the UE is additionally configured to identify control information regions according to one or more predetermined schemes. In some embodiments, the client device may be required to try decoding multiple "hypotheses" to determine the location of control channel information. For example, a UE may be configured to identify one or more physical resources containing or likely to contain control channel information. While it is undesirable to blindly search for control regions, searching a small set of hypotheses can significantly reduce network coordination requirements without undue performance losses in the UE operation. It will be appreciated, however, that the apparatus may also use external or provided information to help identify the control information regions of interest.

In one exemplary embodiment, the UE is configured to determine the control region according to a flexible frequency partitioning. In one such variant, the frequency partitioning is dynamically configured, e.g., the resources may change over time based on a cell-specific, semi-static or dynamic pattern. In other variants, the frequency partitioning is fixed but distinct for each transmitter. For example, in cell-specific schemes the UE may be able to determine the control region according to the particular cell identifier it is connected to (e.g., the control region is selected based on a hash function based on the cell identifier, etc.). It is further appreciated that the control region may be applicable for only a subset of a cell; for instance, Remote Radio Head (RRH) may only provide enough coverage for a subset of the entire cell.

In still other embodiments, it is appreciated that the configurability of the control channel structure previously described enables dynamic decoding based on resource, usage, and/or network considerations. For instance, a UE could decode various elements of the ePDCCH to support certain applications or operations and/or disregard other elements of the ePDCCH for unnecessary applications or operations.

Various other aspects of the present invention are readily appreciated by those of ordinary skill in the related arts.

Exemplary Base Station (BS) Apparatus—

Figure 7:
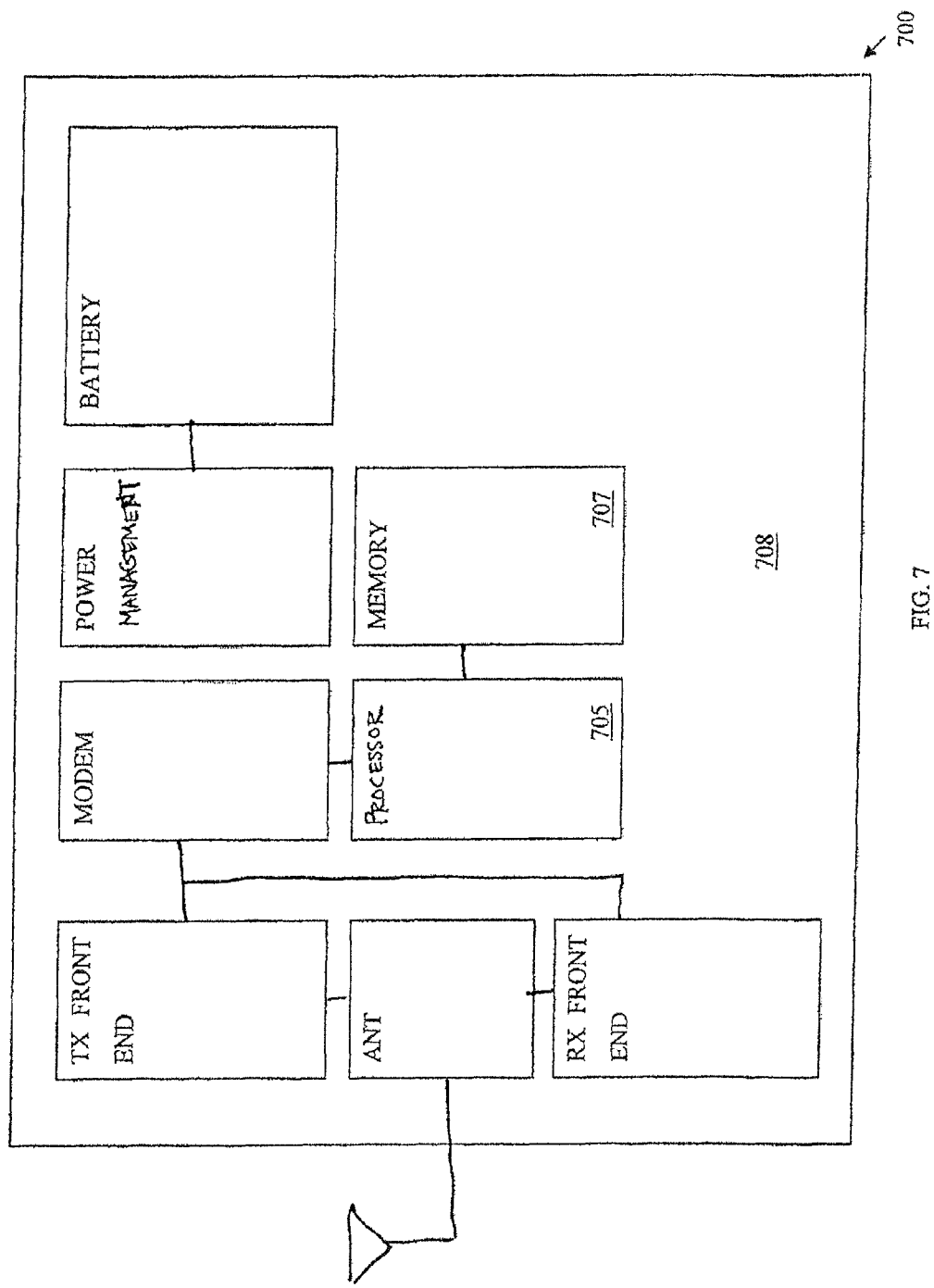
FIG. 7 is a functional block diagram illustrating one embodiment of a server device incorporating the enhanced control channel functionality of the invention.

Referring now to FIG. 7, exemplary server or base station (BS) apparatus 700 useful in implementing the methods of the present invention is illustrated. As used herein, the terms "server" and "BS" include, but are not limited to base stations (e.g., NodeB, eNodeB, etc.), access points, relay stations, etc. The configuration of control channel transmission is preferably performed in software, although firmware and/or hardware embodiments are also envisioned; this apparatus is described subsequently herein with respect to FIG. 7.

The BS apparatus 700 includes a processor subsystem 705 such as a digital signal processor, microprocessor, field-programmable gate array, or plurality of processing components mounted on one or more substrates 708. The processing subsystem may also include an internal cache memory. The processing subsystem 705 is connected to a memory subsystem 707 including memory which may for example, include SRAM, flash and SDRAM components. The memory subsystem may implement one or a more of DMA type hardware, so as to facilitate data accesses as is well known in the art. In the illustrated embodiment, the processing subsystem additionally includes subsystems or modules for implementing the enhanced control channel functionality described previously herein. These subsystems may be implemented in software or hardware which is coupled to the processing subsystem. Alternatively, in another variant, the subsystems may be directly coupled to the digital baseband.

In one exemplary embodiment, the BS is additionally configured to transmit one or more dynamically configurable control information regions according to one or more predetermined schemes. In some variants, the dynamically configurable control information regions augment existing legacy schemes for control information regions. In other variants, the dynamically configurable control information wholly supplants the legacy control information regions; these regions can be configured and/or signaled by the network to assist in faster acquisition.

In one exemplary embodiment, a user equipment (UE) is configured to determine the control region according to a flexible frequency partitioning. In one such variant, the frequency partitioning is dynamically configured, e.g., the resources may change over time based on a cell-specific, semi-static or dynamic pattern. In other variants, the frequency partitioning is fixed but distinct for each transmitter. For example, in cell-specific schemes the UE may be able to determine the control region according to the particular cell identifier it is connected to (e.g., the control region is selected based on a hash function based on the cell identifier, etc.). It is further appreciated that the control region may be applicable for only a subset of a cell; for instance, Remote Radio Head (RRH) may only provide enough coverage for a subset of the entire cell.

In still other embodiments, it is appreciated that the configurability of the control channel structure previously described enables dynamic decoding based on resource, usage, and/or network considerations. For instance, a UE could decode various elements of the ePDCCH to support certain applications or operations and/or disregard other elements of the ePDCCH for unnecessary applications or operations. In yet other embodiments, the UE is configured to identify one or more physical resources containing or likely to contain control channel information. For example, the UE may attempt to decode multiple "hypotheses"; which it is undesirable to blindly search for control regions, searching a small set of hypotheses can significantly reduce network coordination requirements without undue burden on the UE. Specifically, the network has some flexibility in providing control information to resolve e.g., resource contentions, network congestion, network expansion, etc.

Various other aspects of the present invention are readily appreciated by those of ordinary skill in the related arts.

Method—

Figure 8:
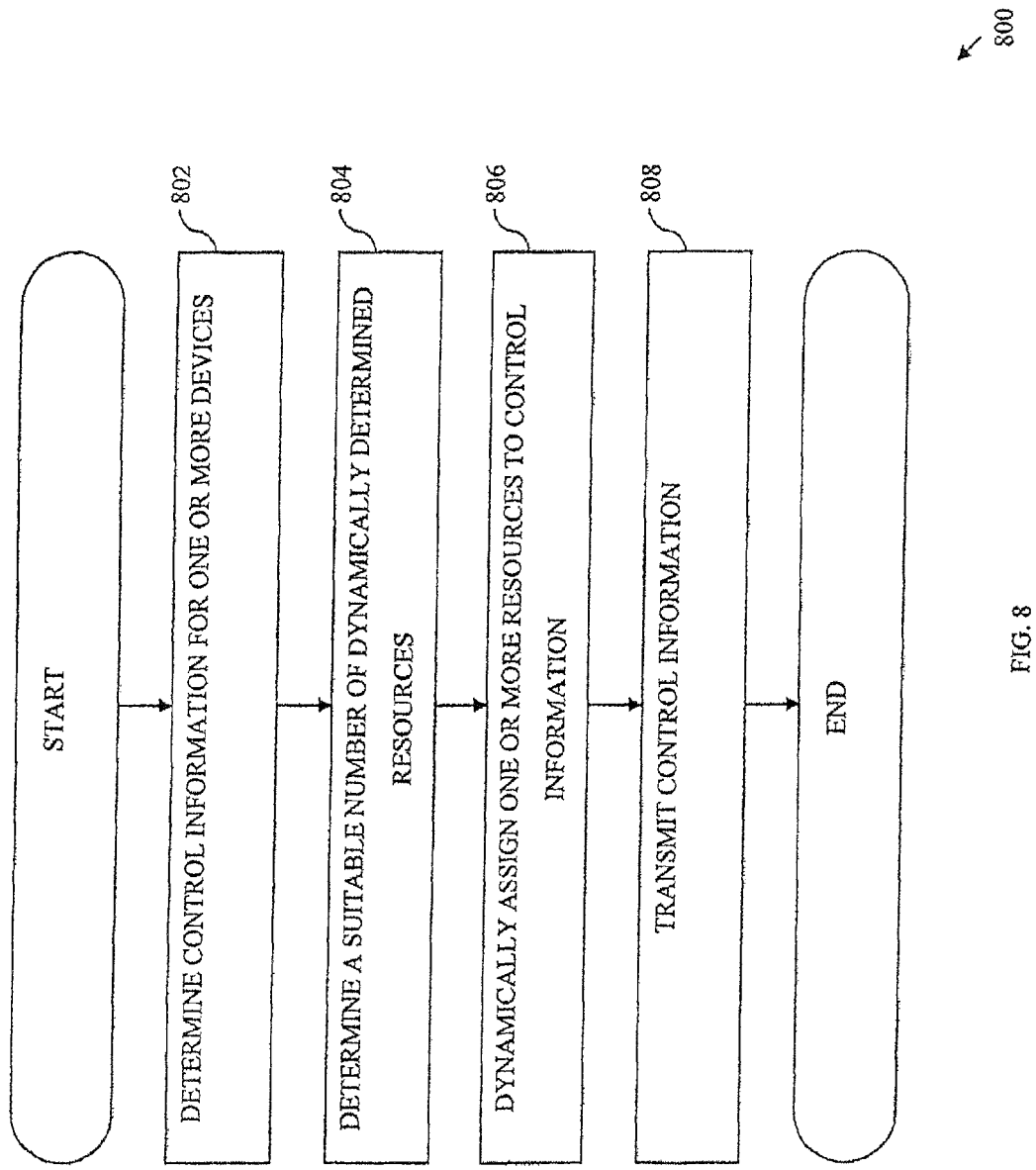
FIG. 8 is a functional block diagram illustrating one generalized method for dynamic allocation of resources for transmission of control information within an extensible and scalable control channel of a wireless network, according to various aspects of the present invention.

Referring now to FIG. 8, one embodiment of a generalized method 800 for dynamic allocation of resources for transmission of control information within an extensible and scalable control channel of a wireless network is illustrated and described.

In one aspect of the present invention, the extensible and scalable control channel of the wireless network is based on a frequency division multiplexing (FDM) scheme. Specifically, each control region is demarcated according to a relevant frequency range. Moreover, as bandwidth increases or decreases, the control regions can be expanded, or contracted accordingly. In alternate embodiments, the control region may be based on a time division multiplexing (TDM) scheme, where each control region is specified according to a relevant time range.

In a second aspect of the present invention, the control regions are spatially distributed so as to reduce interference with one another within the same cell. For example, consider a cell having multiple RRHs; each RRH can be assigned to a control region so as to minimize interference with its neighboring RRHs (for an FDM based scheme, each RRH is assigned a different spectral range). Moreover, it is appreciated that due to the relatively low transmission power of each RRH (typical RRH transmit at approximately 20 dBm, as compared to an eNB which transmits at 43 dBm 49 dBm), a cell may be contain multiple RRHs which are assigned to the same control region but which are sufficiently separated to avoid interference.

In a third aspect, it is appreciated that within each control region the physical resource blocks (PRBs) assigned to each user can be further logically permuted, so as to maximize frequency diversity for each user. More directly, such randomization ensures that the effects of any interferer that impacts only a few PRBs will be distributed among the population of users serviced by that control region.

In a fourth aspect, the mobile device is notified of its associated control region. In one embodiment, a cell management entity determines (for at least a subset of its serviced population) an appropriate control region for the mobile device. The cell management entity is further configured to update the associated control region as the mobile devices move from RRH to RRH. Depending on certain mobility considerations, the mobile device may be assigned to a particular RRH (e.g., for a designated number of transmission time intervals (TTI), etc.), or the eNB. For example, where a mobile device is quickly moving, the cell management entity may not assign the mobile device to a RRH at all. In contrast, where a mobile device is largely stationary, the control entity may assign the mobile device to a RRH and/or a specific control region for a large number of TTI.

Moreover, those of ordinary skill in the related arts will recognize that unlike legacy schemes for control channel operation (e.g., see Prior Art Physical Downlink Control Channel (PDCCH)) which are based on a number of OFDM symbols at the start of each subframe, various embodiments of the present invention may operate on varying degrees of granularity. For example, a control region for a mobile device can be specified on a TTI basis, slot basis, subframe basis, frame basis, etc. The control channel overhead can be optimized according to various network considerations. For instance, where mobile device management requires significant control overhead, the network may switch to shorter time intervals for the control region(s) (e.g., slot based transmissions). In contrast, where control channel overhead is low, the network may opt for longer time intervals (e.g., subframe based transmissions).

In a fifth aspect of the present invention, fine control over the control region for each mobile device enables beamforming capabilities. As a brief aside, legacy control channel operation was limited to a broadcast of the control information over several symbols at the start of each subframe. Prior art mobile devices needed to: (i) decode the Physical Control Format Indicator Channel (PCFICH), (ii) decode the cell specific reference signals (CRS), (iii) perform channel estimation based on the CRS, and (iv) decode the control symbols. In particular, the CRS is broadcast as a cell-specific signal, and is not device specific. In contrast, various embodiments of the present invention can be configured so as to use device specific reference signals with the appropriate control region (e.g., demodulation reference signals (DM-RS)). In particular, the DM-RS of a specific control region are specific to a particular device. This specificity can be leveraged by the network and device to adjust transmission and reception weights, so as to enable beamforming of the device specific control channels.

At step 802, one or more control information for a population of devices is determined, Common examples of control information include, without limitation, scheduling information, operational information, formatting information, etc. For instance, scheduling information may include: resource requests, resource grants, resource allocations, etc. Typical resources for use in wireless networks include: time slots, frequency bands, spreading codes, or any combination of the foregoing. Operational information may include: supported features, non-supported features, identifying information (e.g., network identification, serving station identification, etc.). Formatting information may include: requests for a transport format, grants for a transport format, assignments to a transport format, etc. In one exemplary embodiment, resources are based on a combination of time slots and frequency subcarriers.

In one exemplary embodiment, the control channel information is formatted for transmission as a Downlink Control Information (DCI) message. A DCI is generated based on a set of parameters that includes: the number of downlink Resource Blocks (RBs), the DCI format, etc.

At step 804, a suitable number of dynamically determined resources is determined for bearing at least a subset of the one or more control information. Generally, control channel information is determined based on current network activity and distributed to the population of devices to optimize network performance. In one embodiment, the suitable number of dynamically determined resources is based on a population of legacy devices. In other embodiments, the suitable number of dynamically determined resources is based on the type of control information. In still other embodiments, the number of dynamically determined resources is based on network configuration. Moreover, it is appreciated that in some embodiments, the dynamically determined resources are sufficient for all control information.

Each of the at least subset of one or more control information is dynamically assigned to a resource at step 806. In one exemplary embodiment, the one or more control information is assigned to a resource which is quickly identifiable by the receiving client device. Specifically, it may be desirable to limit the overall decoding burden for the client device. In some embodiments, the client device may be required to try decoding multiple "hypotheses" which are still significantly less than the entire bandwidth. By limiting the distribution of control information to only a few hypotheses, a client device can try each hypothesis to determine the location of control channel information.

For example, in one such variant, the frequency resources in each slot are partitioned into a number of Frequency Partitions (FP) where each frequency partition contains one or more control information regions. Each region consists of an integer number of physically consecutive or logically consecutive resources. In some embodiments, each control information region may be further associated with a transmitter of a network of transmitters. For example, in one exemplary embodiment, an enhanced Physical Downlink Control Channel (ePDCCH) region is associated with a Remote Radio Head (RRH) of a cellular network cell. Within the foregoing system, a client device does not have to search the entire spectral bandwidth to find the appropriate control information, rather the client device can quickly identify the appropriate control information within the control region and decode it accordingly.

In one exemplary embodiment, the partitioning of resources is flexible and can be dynamically configured, e.g., the resources may change over time based on a cell-specific, semi-static or dynamic pattern. For example, the resource partitioning may be based on e.g., overall network complexity, network capabilities, device capabilities, device population size, etc. Dynamic sizing can be used to support arbitrarily large payloads; for example, within LTE networks flexible payload capabilities can accommodate larger format DCIs (e.g., Transmission Mode 9, etc.). Moreover, since the size of ePDCCH regions can be larger (or smaller), collisions across different cells and inter-cell interference can be more effectively and flexibly mitigated.

In certain schemes, control information can be distributed over network resources to maximize diversity techniques. For example, by permuting control information (and in some cases redundant control information) throughout the available time and frequency ranges of resources, reception issues which affect certain resources (e.g., momentary interference that affects a time slot and/or subcarrier) can be mitigated. For example, in one exemplary embodiment an ePDCCH region contains one or more ePDCCH, where each ePDCCH is mapped to a number of enhanced Control Channel Elements (eCCEs), and each eCCE is mapped to one or more Physical Resource Blocks (PRBs). The PRBs are distributed in both time and frequency such that if one or more PRB is lost, the remaining PRBs can be used to reconstruct the ePDCCH.

Additionally, it is recognized that the flexible allocation of control information can support features including soft frequency partitioning and/or Fractional Frequency Reuse (FFR) techniques. For instance, control information can be flexibly allocated across frequency to create configurable frequency partitions in control and data regions. Frequency partitioning can be particularly useful for aggregated spectral resources (e.g., where the total network bandwidth is composed of multiple disparate frequency bands). For example, frequency partitioning can provide control information over only a subset of the aggregated bandwidth, where the client device does not have to receive the entire aggregated spectrum to determine the control information. Additionally, frequency control can be used to control the amount of power distributed for providing data and control. For example, in prior art LTE networks, the PDCCH was transmitted across the entire spectral bandwidth, thus a change to power would affect the entire bandwidth. Various embodiments of the present invention can increase transmit power for only the control region of the ePDCCH.

One benefit to providing configurable control information is that control information does not have to be broadcast over the entire cell. In particular, control information need only be transmitted within the relative vicinity of the applicable user. For this reason, rather than broadcasting control information for all devices within the cell, various embodiments of the present invention are particularly useful for implementing user-specific control information. In one exemplary embodiment, a RRH only transmits control information which is applicable for its set of serviced subscribers. This can contribute greatly to overall network resource utilization.

Additionally, certain user-specific functionalities can be leveraged for further improvements. For instance, the control information may be provided to the subscriber in conjunction with user-specific reference signals. For example, in one exemplary embodiment, the ePDCCH is provided in conjunction with Demodulation Reference Signals (DM-RS) to assist in channel estimation and coherent detection for a specific subscriber device. Each user-specific DM-RS can be additionally beamformed for the specific user. During beamforming, the transmitter modifies the transmission power from each antenna so as to constructively interfere at a target receiver, and in some cases reducing interference for unintended receivers. Beamforming DM-RS can greatly improve channel estimates, etc.

In still another embodiment, control information can be provided to users based on the finest data granularity provided by the communications network. For example, within LTE networks, the smallest increment of data transmission is the Physical Resource Block PRB). Each PRB is approximately 2% of the bandwidth resources for a 10 MHz system, and only 1% in a 20 MHz system. Providing higher granularity control resources can reduce underutilization of network resources. Consider a prior art LTE network that could only allocate one, two or three OFDM symbols for control data (e.g., 7%, 14%, and 21% of network resources, respectively), if the PDCCH exceeds the capacity of one OFDM symbol, then the PDCCH is stepped to the next increment. If only marginally more information was transmitted, then the bulk of that newly allocated OFDM symbol is wasted. In contrast, exemplary embodiments of the present invention may simply allocate the additional PRBs necessary to provision the additional ePDCCH information.

Referring back to FIG. 8, at step 808, the one or more control information is transmitted according to the assigned resources. In one exemplary embodiment, the control information is transmitted from multiple transmission points, where the transmission point need not have identical transmission schedules for the control information. For example, within a cellular network, multiple Remote Radio Heads (RRHs) may each transmit control information according to individually distinct schedules.

Myriad other schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method, comprising:
   determining a first frequency partition of a plurality of frequency partitions in a system bandwidth, wherein each of the plurality of frequency partitions contains one or more control channel regions;
   decoding a control channel from a portion of resources of a first control channel region of the one or more control channel regions, wherein the control channel is decoded based on at least one control channel element that is mapped to resources that are distributed in time and frequency in the first control channel region, wherein the first control channel region is of a scalable size; and
   extracting control channel information from the control channel.

2. The method of claim 1, further comprising:
   receiving an update for a second control channel region for receiving control information.

3. The method of claim 2, wherein the second control region is in a second frequency partition of the plurality of frequency partitions.

4. The method of claim 1, further comprising:
   receiving an identification of the first control channel region for receiving control information within the first frequency partition.

5. The method of claim 1, further comprising:
   identifying the first control channel region by decoding multiple hypotheses across one or more of the control channel regions.

6. The method of claim 1, wherein a number of the plurality of frequency partitions comprises one of two, three or four frequency partitions.

7. The method of claim 1, further comprising:
   determining a beginning of the first frequency partition based on a frequency offset from a reference location.

8. A user equipment (UE), comprising:
   a wireless interface configured to communicate with one or more base station devices;
   a non-transitory computer-readable apparatus having a storage medium with at least one computer program stored thereon; and
   a processor configured to execute the computer program, wherein execution of the computer program causes the UE to perform operations comprising:
      determining a first frequency partition of a plurality of frequency partitions in a system bandwidth, wherein each of the plurality of frequency partitions contains one or more control channel regions;
      decoding a control channel from a portion of resources of a first control channel region of the one or more control channel regions, wherein the control channel is decoded based on at least one control channel element that is mapped to resources that are distributed in time and frequency in the first control channel region, wherein the first control channel region is of a scalable size; and
      extracting control channel information from the control channel.

9. The UE of claim 8, wherein the operations further comprise:
   receiving an update for a second control channel region for receiving control information.

10. The UE of claim 9, wherein the second control region is in a second frequency partition of the plurality of frequency partitions.

11. The UE of claim 8, wherein the operations further comprise:
    receiving an identification of the first control channel region for receiving control information within the first frequency partition.

12. The UE of claim 8, wherein the operations further comprise:
    identifying the first control channel region by decoding multiple hypotheses across one or more of the control channel regions.

13. The UE of claim 8, wherein a number of the plurality of frequency partitions comprises one of two, three or four frequency partitions.

14. The UE of claim 8, wherein the operations further comprise:
    determining a beginning of the first frequency partition based on a frequency offset from a reference location.

15. A digital processor configured to:
    determine a first frequency partition of a plurality of frequency partitions in a system bandwidth, wherein each of the plurality of frequency partitions contains one or more control channel regions;
    decode a control channel from a portion of resources of a first control channel region of the one or more control channel regions, wherein the control channel is decoded based on at least one control channel element that is mapped to resources that are distributed in time and frequency in the first control channel region, wherein the first control channel region is of a scalable size; and
    extract control channel information from the control channel.

16. The digital processor of claim 15, further configured to:
    receive an update for a second control channel region for receiving control information.

17. The digital processor of claim 16, wherein the second control region is in a second frequency partition of the plurality of frequency partitions.

18. The digital processor of claim 15, further configured to:
    receive an identification of the first control channel region for receiving control information within the first frequency partition.

19. The digital processor of claim 15, further configured to:
    identify the first control channel region by decoding multiple hypotheses across one or more of the control channel regions.

20. The digital processor of claim 15, wherein a number of the plurality of frequency partitions comprises one of two, three or four frequency partitions.

* * * * *